US009366557B2

(12) United States Patent
Soreefan

(10) Patent No.: US 9,366,557 B2
(45) Date of Patent: Jun. 14, 2016

(54) THERMAL FLOW SENSORS HAVING ISOLATED MEMBRANES

(71) Applicant: Itron, Inc., Liberty Lake, WA (US)

(72) Inventor: Ibne Soreefan, Union, KY (US)

(73) Assignee: ITRON, INC., Liberty Lake, WA (US)

( * ) Notice: Subject to any disclaimer, the term of this patent is extended or adjusted under 35 U.S.C. 154(b) by 128 days.

(21) Appl. No.: 14/096,974

(22) Filed: Dec. 4, 2013

(65) Prior Publication Data

US 2015/0153209 A1 Jun. 4, 2015

(51) Int. Cl.

*G01F 1/68* (2006.01)
*G01F 1/688* (2006.01)
*G01F 1/684* (2006.01)

(52) U.S. Cl.

CPC *G01F 1/688* (2013.01); *G01F 1/68* (2013.01); *G01F 1/684* (2013.01); *G01F 1/6847* (2013.01)

(58) Field of Classification Search

CPC .......... G01F 1/6847; G01F 1/688; G01F 1/68
USPC .................................. 73/204.23, 204.11, 861
See application file for complete search history.

(56) References Cited

U.S. PATENT DOCUMENTS 4,501,144 A * 2/1985 Higashi ................... G01F 1/698 73/204.26
5,452,610 A * 9/1995 Kleinhans et al. ......... 73/204.26
6,460,411 B1 10/2002 Kersjes et al.
6,845,662 B2 * 1/2005 Kawai ................... G01F 1/6845 73/204.26
7,233,000 B2 6/2007 Nassiopoulou et al.
2004/0076215 A1 * 4/2004 Baumbach ...................... 374/29
2004/0261520 A1 * 12/2004 Lotters ....................... 73/204.26
2011/0132064 A1 * 6/2011 Kramer et al. ................ 73/1.16

FOREIGN PATENT DOCUMENTS

EP 2378254 10/2011
EP 2477008 7/2012
WO 2007067607 A2 6/2007

OTHER PUBLICATIONS

Patent Cooperation Treaty, "International Search Report," issued in connection with Application No. PCT/US2014/068345, Mar. 11, 2015, 3 pages.
Patent Cooperation Treaty, "Written Opinion of the International Searching Authority," issued in connection with Application No. PCT/US2014/068345, Mar. 11, 2015, 7 pages.

* cited by examiner

*Primary Examiner* — Lisa Caputo
*Assistant Examiner* — Nathaniel T Woodward
(74) *Attorney, Agent, or Firm* — Hanley, Flight & Zimmerman, LLC

(57) ABSTRACT

Thermal flow sensors are disclosed. An example thermal flow sensor includes a chip substrate; a heater mounted to a first membrane on the chip substrate; and a temperature sensor mounted to a second membrane on the chip substrate, the second membrane being isolated from the first membrane by material of the chip substrate.

14 Claims, 5 Drawing Sheets

THERMAL FLOW SENSORS HAVING ISOLATED MEMBRANES

FIELD OF THE DISCLOSURE

This disclosure relates generally to sensing devices, and, more particularly, to flow sensors.

BACKGROUND

Metering systems include different types of sensors to collect different types of information. In some metering systems, sensors are deployed to collect information indicative of an amount of a material consumed at a site. In some instances, the sensors are capable of detecting a mass flow rate of the material to be metered.

DETAILED DESCRIPTION

Figure 1:
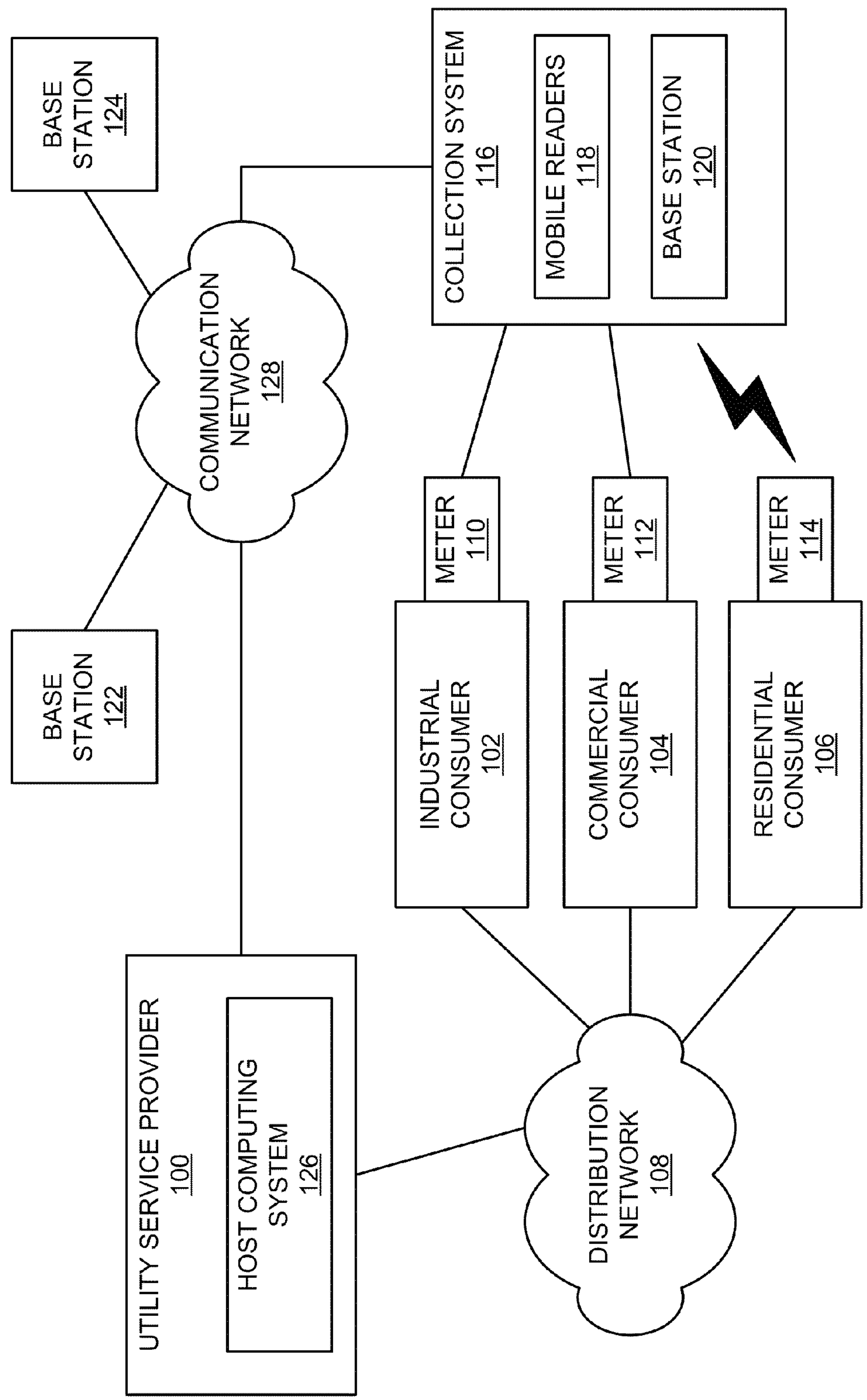
FIG. 1 is a schematic illustration of an environment in which example methods and apparatus disclosed herein may be implemented.

A thermal flow sensor is used to measure flow characteristics such as, for example, a mass flow rate of a gas flowing through conduit. Some thermal flow sensors utilize a heating element and a temperature sensing element that cooperate to measure the mass flow rate of the gas. Although the heating element may also be capable of sensing a temperature, the heating element is referred to herein as a heater and the temperature sensing element is referred to herein as a temperature sensor. Such thermal flow sensors are oriented in a flow of the gas such that the temperature sensor is downstream from the heater. As the gas flows over the thermal flow sensor, heat generated by the heater is transferred to the gas via a convective transfer of heat. By the time the gas flows to the temperature sensor, an amount of the heat transferred to the gas by the heater has dissipated. That is, the flowing gas has a cooling effect on the heat transferred to the gas by the heater. The thermal flow sensor utilizes the cooling effect (e.g., the dissipation of the heat) of the gas to determine, for example, the mass flow rate of the gas over the thermal flow sensor. In particular, the temperature sensor measures the temperature of the gas downstream from the heater. The thermal flow sensor utilizes the temperature information captured by the temperature sensor and the amount of heat generated by the heater to measure, for example, the mass flow rate of the gas. While several techniques and/or algorithms may be used for the calculation of the mass flow rate, the calculation of the mass flow rate by the thermal flow sensors is based on convective transfers of heat.

Examples disclosed herein recognize that configurations of known thermal flow sensors may result in conductive transfers of heat that affect the calculations performed by the thermal flow sensor in an undesired, unpredictable manner. In particular, examples disclosed herein recognize that heat conducting from the heater to the temperature sensor may affect the temperature measurement taken by the temperature sensor. Put another way, examples disclosed herein recognize that while the temperature sensor is tasked with detecting convective transfer of heat, the temperature sensor may experience unintended conductive heat transfer from the heater. Examples disclosed herein recognize that this undesirable conductive heat transfer results from configurations of known thermal sensors in which the heater and the temperature sensor are deposited on a single membrane. In such configurations of known thermal sensors, the heat conducts from the heater to the temperature sensor via the single membrane. When such conduction occurs, the effects of the convective heat transfer are difficult to distinguish from the effects of the unintended conductive heat transfer. That is, the algorithms, equations and/or calculations that are performed via the thermal flow sensor are based on convective heat transfer, rather than conductive heat transfer. Accordingly, unintended conductive transfer of heat from the heater to the temperature sensor may negatively impact performance (e.g., accuracy and/or precision) of the thermal flow sensor.

Example methods and apparatus disclosed herein reduce and/or eliminate unintended and unwanted effects of conductive heat transfers between elements in thermal flow sensors. As described in detail below, example thermal flow sensors disclosed herein include a chip substrate having a heater mounted on a first membrane and a temperature sensor mounted on a second membrane separate from the first membrane. The first and second membranes of the example thermal sensors disclosed herein are isolated by non-conductive material of the chip substrate. The material of the isolating chip substrate is non-conductive in that substantially (e.g., below a threshold or tolerance) no heat is conducted by the chip substrate, especially in comparison with a metal. With the configuration disclosed herein, conductive heat transfer between the heater and the temperature sensor is limited or entirely prevented via the separation of the first membrane (on which the heater is mounted) and the second membrane (on which the temperature sensor is mounted). In particular, the material of the example chip substrate disclosed herein absorbs the heat generated by the heater before the heat is conducted to the temperature sensor. Thus, in contrast to known devices, temperature sensors of the example thermal flow sensors disclosed herein are not polluted by heat conduction. Instead, the temperature sensors of the example thermal flow sensors disclosed herein capture convective heat transfer information untainted by the effects of heat conducted to the temperature sensor. Thus, calculations based on information collected by the example thermal flow sensors disclosed herein are more accurate than calculations performed via previous thermal flow sensors.

The examples disclosed herein are especially beneficial when the corresponding thermal flow sensor is tasked with accurately detecting relatively low mass flow rates. For example, when thermal flow sensors are deployed in applications utilizing a pilot light, only a small amount of gas flows over the thermal sensor, often for significant amounts of time. During such times, in known thermal flow sensors, the negative effects of conductive heat transfer to the temperature sensor from the heater are more detrimental to the accuracy of the corresponding calculation when compared to larger and/or faster flows of gas. Accordingly, the reduction or elimination of the conductive heat transfer provided by the examples disclosed herein is particularly useful in low-flow applications.

FIG. 1 is an example environment in which example disclosed herein may be implemented. The example of FIG. 1 includes a utility service provider 100 that supplies a consumable resource (e.g., natural gas, electricity, water, etc.) to a plurality of consumers 102-106 via a distribution network 108. The example utility service provider 100 of FIG. 1 charges the consumers 102-106 based on usage of the supplied consumable resource. To determine the charges, the utility 100 collects usage information associated with individual ones of the consumers 102-106. To do so, the utility 100 provides meters 110-114 to the corresponding consumers 102-106. Depending on the type of resource supplied by the example utility 100 of FIG. 1, the meters 110-114 measure, for example, usage of gas, electricity, water, etc. Usage information monitored by the meters 110-114 is obtained by a collection system 116 associated with the utility service provider 100. The example collection system 116 of FIG. 1 includes a plurality of mobile readers 118 and a base station 120. The example mobile readers 118 of FIG. 1 include communication devices (e.g., transceivers) deployed on, for example, a vehicle that travels near locations of the consumers 102-106 to establish communication with the meters 110-114. The example base station 120 of FIG. 1 is a stationary communication device, such as a cellular base station, that establishes communication with nearby meters 110-114. In the example of FIG. 1, the meters 110-114 are assigned to communicate with the base station 120 due to, for example, the base station 120 being in proximity to the meters 110-114 and/or an interoperability between the meters 110-114 and the base station 120. Other meters associated with other consumers may be assigned to other base station(s) 122, 124 utilized by the example utility service provider 100 to collect data. In some examples, the mobile readers 118 collect usage information from the meters 110-114 (e.g., via radio communication(s)) and the mobile readers 118 convey the data to the corresponding base station 120.

The example meters 110-114 of FIG. 1 are in communication with the base station 120 and/or the mobile readers 118 via any suitable wired and/or wireless technology and/or protocol. While the example collection system 116 of FIG. 1 includes base stations 120-124 and mobile readers 118, additional or alternative types of collection devices may be employed by the example utility service provider 100 of FIG. 1. The example mobile readers 118, the example base stations 120-124, and/or any other device in communication with the meters 110-114 to collect data may be referred to herein as collection devices.

Component(s) of the example collection system 116 of FIG. 1 communicate data (e.g., usage information collected from the meters 110-114) to a host computing system 126 of the example utility service provider 100 via, for example, a communication network 128 (e.g., a LAN, WAN, cellular network, the Internet, etc.). Additionally or alternatively, component(s) of the example collection system 116 communicate directly with the host computing system 126. The example host computing system 126 of FIG. 1 performs a plurality of tasks including, for example, coordinating collection of usage information. In the illustrated example of FIG. 1, the collection of usage information includes exchanges of messages between the meters 110-114, collection devices (e.g., the base station 120 and/or the mobile readers 118) and/or the host computing system 126.

Figure 2:
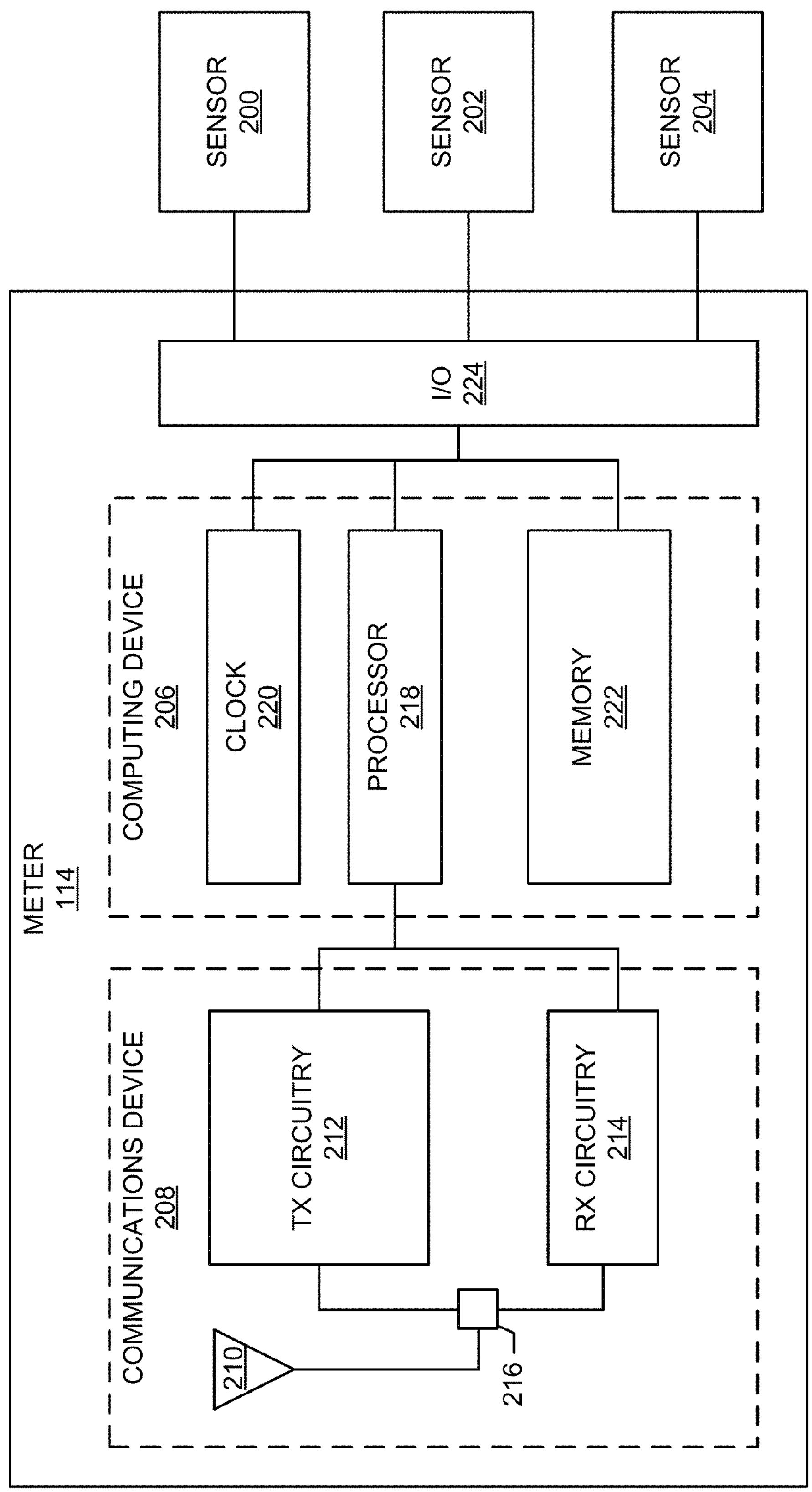
FIG. 2 is a block diagram of an example implementation of one of the example meters of FIG. 1.

FIG. 2 illustrates and example implementation of one of the example meters 110-114, such as the meter 114 deployed in connection with the residential consumer 106. The example meter 114 of FIG. 2 gathers and stores data from a first, second and third sensors 200-204, which are capable of monitoring parameter(s) associated with, for example, usage of the resource provided by the example utility service provider 100 of FIG. 1. In the example of FIG. 2, the first sensor 200 is an example thermal flow sensor constructed in accordance with teachings of this disclosure. An example implementation of the example thermal flow sensor 200 of FIG. 2 is disclosed below in connection with FIG. 3. The example meter 114 obtains, stores, formats and/or encodes the sensor data according to one or more protocols and transmits the data to, for example, one of the mobile readers 118, the base station 120, and/or the host computing system 126 of FIG. 1. The example meter 114 of FIG. 2 is also capable of receiving data from, for example, the mobile readers 118, the base station 120, and/or host computing system 126 of FIG. 1. Although shown in FIG. 2 as separate from the example meter 114, one or more of the sensors 200-204 (e.g., the example thermal flow sensor 200) may be considered a component of the example meter 114 and/or integral with the example meter 114.

The example meter 114 of FIG. 2 includes a computing device 206 communicatively coupled to a communications device 208. In the illustrated example, the communications device 208 is a radio-based transceiver including an antenna 210, transmit circuitry 212, receive circuitry 214, and an antenna multiplexer or duplexer 216 that switches between the transmit circuitry 212 and the receive circuitry 214 depending on a mode of operation of the communications device 208. The multiplexer 216 may be a duplexer, which allows simultaneous operation of the transmit circuitry 212 and the receive circuitry 214. The communications device 208 may be configured to transmit RF-based communication signals according to any suitable modulation protocol(s), such as DSSS, FHSS, FM, AM, etc. In some examples, the transmit circuitry 212 and/or the receive circuitry 214 are implemented as an RF integrated circuit (RFIC) chip and comprise a plurality of components including, for example, mixers, a voltage controlled oscillator (VCO), a frequency synthesizer, automatic gain control (AGC), passive and/or active filters, such as harmonic filters, dielectric filters, surface acoustic wave (SAW) filters, etc., analog to digital (A/D) converters, digital to analog (D/A) converters, modulators, demodulators, phase-locked loops (PLLs), upconverters, downconverters, and/or other analog or digital component(s) that process baseband signals, RF signals, or IF band signals, etc.

The example computing device 206 of the example meter 114 includes a processor 218, a clock 220 and a memory 222. The example meter 114 of FIG. 2 includes a network I/O interface 224 for interfacing with, for example, the example sensors 200-204. The data obtained via the sensors 200-206 is processed by the processor 218 and stored in the memory 222.

Figure 3:
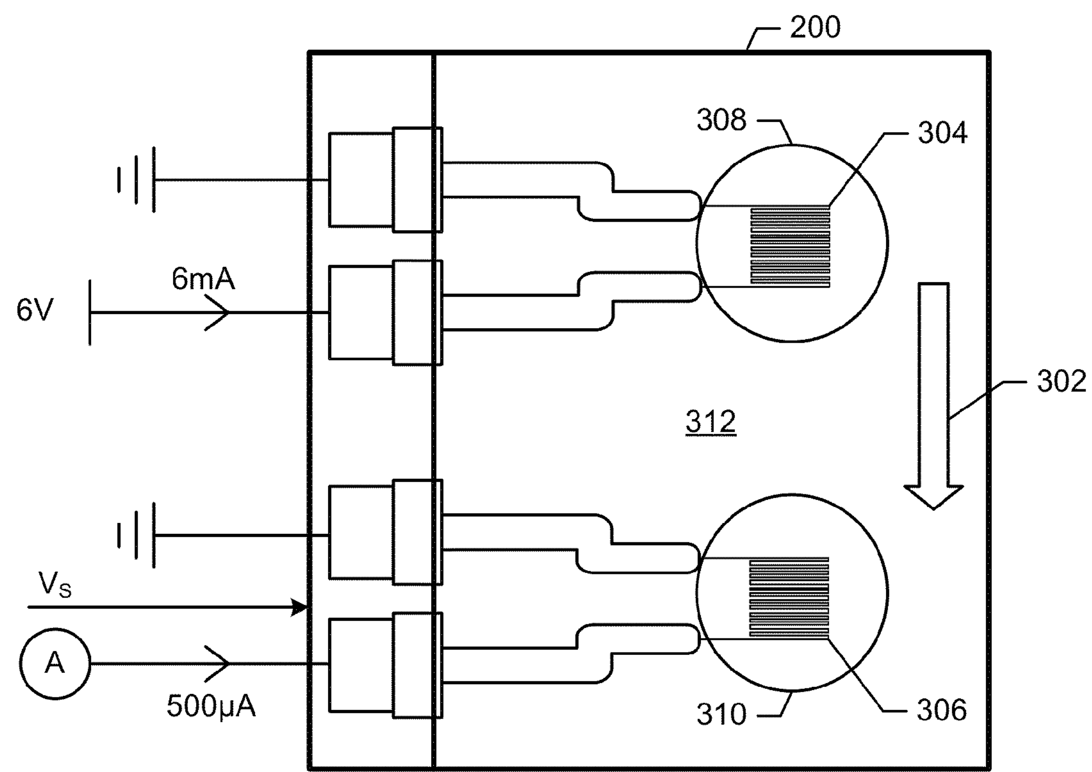
FIG. 3 is a schematic illustration of an example thermal flow sensor disclosed herein.

FIG. 3 illustrates an example implementation of the example thermal flow sensor 200 of FIG. 2 constructed in accordance with teachings of this disclosure. The example thermal flow sensor 200 of FIG. 3 is tasked with gathering data regarding a flow of gas for use in one or more calculations performed by, for example, the example computing device 206 of FIG. 2 and/or a processor associated with the example thermal flow sensor 200. In the illustrated example of FIG. 3, the example thermal flow sensor 200 is deployed in an application that experiences relatively low flows of gas at certain times. For example, the example thermal flow sensor 200 of FIG. 3 may be deployed in an application, device, and/or appliance that includes a pilot light. When the application, device, and/or appliance being monitored by the example thermal flow sensor 200 of FIG. 3 is not operating (e.g., is not consuming a significant amount of gas), the flow of gas does not entirely cease. Accordingly, the example thermal flow sensor 200 of FIG. 3 is tasked with measuring the flow of gas at all times, including instances of low flows. In some examples, the thermal flow sensor 200 of FIG. 3 is additionally or alternatively tasked with measuring higher gas flows (e.g., within a certain accuracy).

When deployed, the example thermal flow sensor 200 of FIG. 3 is oriented such that gas flows in a direction 302 in which the gas flows over a heater 304 and then a temperature sensor 306. While the example thermal flow sensor 200 of FIG. 3 includes a single heater 304 and a single temperature sensor 306, the example thermal flow sensor 200 of FIG. 3 may include additional heater(s) and/or temperature sensor(s). The heater 304 of FIG. 3 is mounted to a first membrane 308 and the example temperature sensor 306 of FIG. 3 is mounted to a second membrane 310. In the illustrated example of FIG. 3, the heater 304 and the temperature sensor 306 are platinum elements and the first and second membranes 308, 310 are polyimide membranes. Alternative types of heaters, temperature sensors, and/or membranes are possible. The components of the example thermal flow sensor 200 (e.g., the heater 304 and the temperature sensor 306 are position under a protective coating that forms a surface over which the gas flows.

The example first membrane 308 of FIG. 3 and the example second membrane 310 of FIG. 3 are separated by material of a chip substrate 312 of the thermal flow sensor 200. In other words, the first membrane 308 is isolated (e.g., thermally) from the second membrane 310 by material of the chip substrate 312. In the illustrated example of FIG. 3, the chip substrate 312 is much thicker than the polyimide membranes 308, 310. For example, the example chip substrate 312 of FIG. 3 is approximately (e.g., within a threshold) 0.5 millimeters (mm) thick and the polyimide membrane is approximately (e.g., within a threshold) 2 microns thick.

The isolation between the first and second membranes 308, 310 on which the heater 304 and the temperature sensor 306 are mounted, respectively, enables the example thermal flow sensor 200 of FIG. 3 to gather more accurate information regarding the gas flow in the direction 302 shown in FIG. 3. In particular, with the separation of the first and second membranes 308, 310, the example temperature sensor 306 gathers temperature data related to the convective transfer of heat that is not polluted by conductive transfer of heat from the heater 304 to the temperature sensor 306. As described above, absent the isolation between the heater 304 and the temperature sensor 306 provided by the example thermal flow sensor 200 of FIG. 3, heat conducted from the heater 304 to the temperature sensor 306 may undesirably affect readings taken by the temperature sensor 306. However, with the separation of the first and second membranes 308, 310 of the example thermal flow sensor 200 of FIG. 3 preventing thermal conduction between the heater 304 and the temperature sensor 306, any temperature data (e.g., temperature change and/or dissipation information) is purely related to convective heat transfer due to the flow of the gas, on which the calculation(s) utilizing the thermal flow sensor 200 are based.

Figure 4:
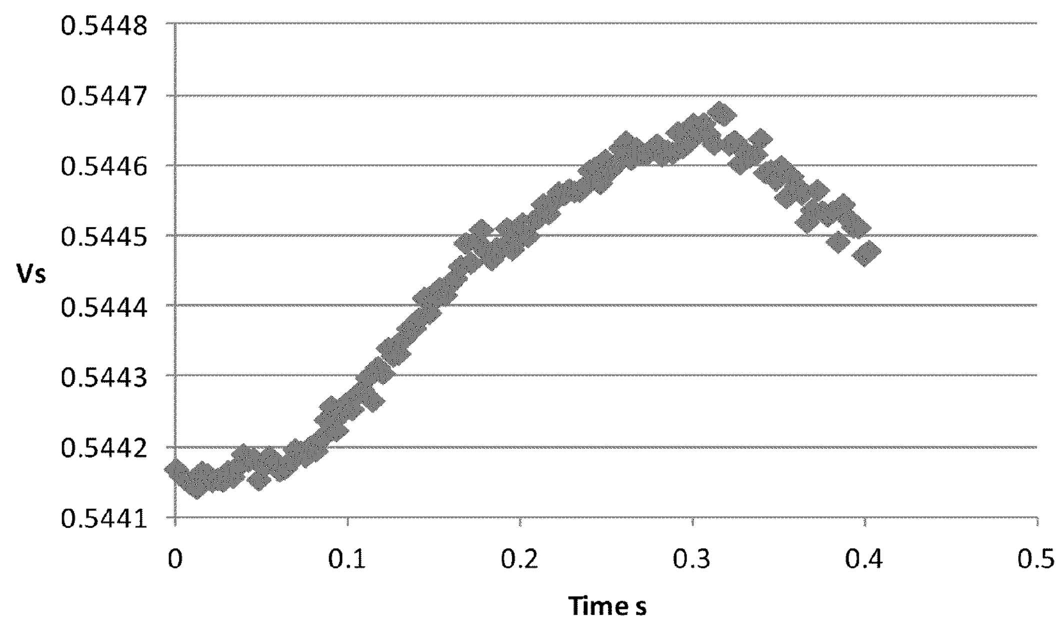
FIG. 4 is a graph including example measurements associated with the example thermal flow sensor of FIG. 3.

As current (e.g., 6 milliamps) is supplied to the heater 304 to generate heat around the heater 304 and as gas flows over the region of the thermal flow sensor corresponding to the heater 304, a portion of a pocket of heat that forms over the heater 304 is transferred to the gas via convection. In the illustrated example of FIG. 3, the heater 304 and the current supplied to the heater 304 are configured to generate heat of a particular, predetermined value. The temperature of the example temperature sensor 306 (e.g., $V_S$ as shown in FIG. 3) is acquired periodically (e.g., every millisecond). A graph including data points obtained via the temperature sensor 306 is shown in FIG. 4. The temperature readings are used in conjunction with calibration information corresponding to an initialization or calibration procedure undergone by the example thermal flow sensor 200. That is, the different temperatures are known to the example thermal flow sensor 200 (or a computing device associated with the thermal flow sensor 200) to correspond to different mass flow rates based on one or more conversions and/or algorithms. In some examples, a constant current is supplied to the heater 304 and a magnitude of the current, a resistance of the heater 304, and a reading taken by the temperature sensor 306 are used as the basis for the mass flow calculation. In some examples, a variable amount of current is supplied to the heater 304 in an attempt to keep a value captured by the temperature sensor 306 constant. In such instances, the variable amount of current needed to maintain the predetermined temperature forms the basis for the calculation of the mass flow rate. Additional or alternative techniques can be used to calculate the mass flow rate.

Figure 5:
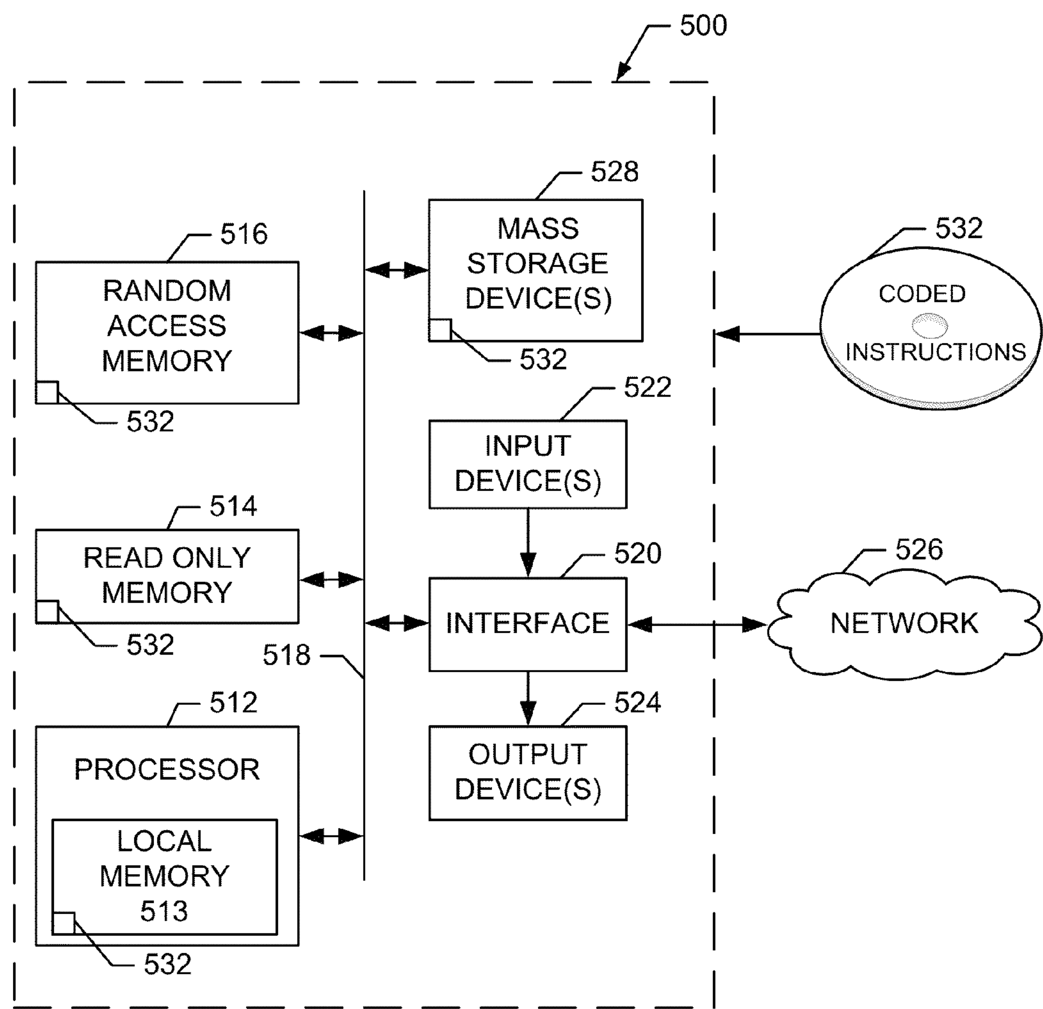
FIG. 5 is a block diagram of an example processing system capable of implementing the example computing device of FIG. 2.

FIG. 5 is a block diagram of an example processor platform 500 capable of implementing the example computing device 206 of FIG. 2. The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 may be stored in the mass storage device 528, in the volatile memory 514, in the non-volatile memory 516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A thermal flow sensor, comprising:

a chip substrate;

a heater mounted to a first membrane on the chip substrate; and a temperature sensor to be positioned downstream from the heater along a direction of a fluid flow when the thermal flow sensor is placed within the fluid flow, the temperature sensor mounted to a second membrane on the chip substrate, the second membrane physically isolated from the first membrane via the chip substrate and being substantially conductively isolated from the first membrane by material of the chip substrate, the chip substrate having a different material from the first and second membranes.

2. The thermal flow sensor as defined in claim 1, wherein the material of the chip substrate is to isolate the first membrane from the second membrane by absorbing heat generated by the heater.

3. The thermal flow sensor as defined in claim 1, the material of the chip substrate being thicker than the first and second membranes.

4. The thermal flow sensor as defined in claim 1, wherein the heater and the temperature sensor include platinum, and the first and second membranes include polyimide.

5. The thermal flow sensor as defined in claim 1, further including a coating to cover the heater and the temperature sensor.

6. The thermal flow sensor as defined in claim 1, the temperature sensor to measure convective heat from the heater via a fluid as the fluid flows from the heater to the temperature sensor.

7. A meter, comprising:

a thermal flow sensor including:

a chip substrate;

a heater mounted to a first membrane on the chip substrate; and a temperature sensor to be positioned downstream from the heater along a direction of a fluid flow when the thermal flow sensor is placed within the fluid flow, the temperature sensor mounted to a second membrane on the chip substrate, the second membrane physically isolated from the first membrane via the chip substrate and substantially isolated from heat conducted from the first membrane by material of the chip substrate, the first and second membranes having a different material from the chip substrate; and a computing device to receive a signal from the thermal flow sensor and to calculate a flow characteristic from the signal.

8. The meter as defined in claim 7, wherein the signal includes temperature data associated with the convective heat from the heater to the temperature sensor.

9. The meter as defined in claim 7, wherein the flow characteristic includes a mass flow rate of gas.

10. The meter as defined in claim 7, wherein the material of the substrate is to isolate the first membrane from the second membrane by absorbing heat generated by the heater.

11. The meter as defined in claim 7, further including a transmitter communicatively coupled to at least one of the meter, the thermal flow sensor, or the computing device, the transmitter to transmit the flow characteristic to a base station.

12. A thermal flow sensor, comprising:

means for generating heat mounted to a first membrane of a chip substrate;

means for sensing temperature to be positioned downstream from the means for generating heat along a direction of a fluid flow when the thermal flow sensor is placed in the fluid flow, the means for sensing temperature mounted to a second membrane of the chip substrate, the second membrane physically isolated from the first membrane, the chip substrate having a different material from the first and second membranes; and means for substantially preventing conductive transfer of heat between the first membrane and the second membrane.

13. The thermal flow sensor as defined in claim 12, the means for preventing conductive heat transfer includes material of the chip substrate to absorb heat generated by the means for generating heat.

14. The thermal flow sensor as defined in claim 12, wherein the first and second membranes include polyimide.

* * * * *